(12) United States Patent
Renaud

(10) Patent No.: US 7,128,577 B2
(45) Date of Patent: Oct. 31, 2006

(54) METHOD FOR PROVIDING DATA TO BE USED BY A THERAPIST FOR ANALYZING A PATIENT BEHAVIOR IN A VIRTUAL ENVIRONMENT

(75) Inventor: Patrice Renaud, 625 St-Arsène Street, Montreal (Québec) (CA) H2M 1K9

(73) Assignee: Patrice Renaud, Montreal (CA)

( * ) Notice: Subject to any disclaimer, the term of this patent is extended or adjusted under 35 U.S.C. 154(b) by 388 days.

(21) Appl. No.: 10/373,660

(22) Filed: Feb. 26, 2003

(65) Prior Publication Data

US 2004/0168117 A1    Aug. 26, 2004

(51) Int. Cl.
*G09B 19/00* (2006.01)
(52) U.S. Cl. .................. 434/236; 434/323; 600/300
(58) Field of Classification Search ........ 434/236–238, 434/55, 219, 247, 307 R, 323, 365; 600/544, 600/587, 27, 300; 715/720; 84/477 R; 73/379.04; 345/156; 704/275; 703/7; 382/131
See application file for complete search history.

(56) References Cited

U.S. PATENT DOCUMENTS

| | | | | |
|---|---|---|---|---|
| 5,429,140 A * | 7/1995 | Burdea et al. | ............... | 600/587 |
| 5,447,166 A * | 9/1995 | Gevins | ................. | 600/544 |
| 5,461,711 A * | 10/1995 | Wang et al. | ................. | 715/720 |
| 5,490,784 A * | 2/1996 | Carmein | .................. | 434/55 |
| 5,728,960 A * | 3/1998 | Sitrick | .................. | 84/477 R |
| 5,807,114 A * | 9/1998 | Hodges et al. | .............. | 434/236 |
| 5,813,863 A * | 9/1998 | Sloane et al. | ............... | 434/236 |
| 6,012,926 A * | 1/2000 | Hodges et al. | .............. | 434/236 |
| 6,149,586 A * | 11/2000 | Elkind | .................. | 600/300 |
| 6,164,973 A * | 12/2000 | Macri et al. | ................. | 434/247 |
| 6,259,889 B1 * | 7/2001 | LaDue | ................... | 434/308 |
| 6,308,565 B1 * | 10/2001 | French et al. | .............. | 73/379.04 |
| 6,425,764 B1 * | 7/2002 | Lamson | ..................... | 434/236 |
| 6,721,706 B1 * | 4/2004 | Strubbe et al. | .............. | 704/275 |
| 6,736,642 B1 * | 5/2004 | Bajer et al. | ................. | 434/236 |
| 6,743,022 B1 * | 6/2004 | Sarel | ......................... | 434/236 |
| 6,976,846 B1 * | 12/2005 | Dupont et al. | .............. | 434/219 |
| 6,996,261 B1 * | 2/2006 | deCharms | .................. | 382/131 |
| 2003/0003433 A1 * | 1/2003 | Carpenter et al. | .......... | 434/323 |
| 2004/0024287 A1 * | 2/2004 | Patton et al. | .................. | 600/27 |
| 2004/0046736 A1 * | 3/2004 | Pryor et al. | ................. | 345/156 |
| 2004/0254771 A1 * | 12/2004 | Riener et al. | ................. | 703/7 |
| 2005/0019734 A1 * | 1/2005 | Peled | ......................... | 434/236 |

FOREIGN PATENT DOCUMENTS

| | | |
|---|---|---|
| CA | 2181011 A1 | 1/1997 |
| CA | 2261647 A1 | 2/1998 |
| CA | 2345013 A1 | 6/2000 |

OTHER PUBLICATIONS

Gramopadhye et al "The Use of Binocular Eye Tracking in Virtual Reality for Aircraft Inspection Training" International Journal of Industrial Engineering, 9(2),pp. 123-132, 2002.

(Continued)

*Primary Examiner*—Joe H. Cheng
(74) *Attorney, Agent, or Firm*—Ogilvy Renault LLP

(57) ABSTRACT

A method and apparatus is disclosed for providing a virtual environment or a visual presentation to a user. A portion of interest is created and depending on a response of the user to the virtual environment or to the visual presentation, a feedback is preferably provided.

6 Claims, 3 Drawing Sheets

OTHER PUBLICATIONS

Vora et al "Using Virtual Reality Technology for Aircraft Visual Inspection Training: Presence and Comparison Studies" Elsevier; Applied Ergonomics, May 28, 2002, pp. 559-570.

Cournia et al "Gaze-vs. Hand-Based Pointing in Virtual Environments" Department of Computer Science, Clemson University; 2 pages, 2003.

Vembar et al "Effect of Visual Cues on Human Performance in Navigating Through a Virtual Maze" Eurographics Symposium on Virtual Environments (2004), The Eurographics Association 2004, 8 pages.

Duchowski et al "Binocular Eye Tracking in VR for Visual Inspection Training" 8 pages, 2001.

Triesch et al "What you see is what you need" Journal of Vision, in press (2003) pp. 1-12).

Triesch et al "Saccade Contingent Updating in Virtual Reality" pp. 95-102, 2002.

Palsson et al "Morphing Beyong Recognition: The Future of Biofeedback Technoiogies", Biofeedback, pp. 14-18, 2002.

Morris Steffin "Virtual Reality Biofeedback in Chronic Pain and Psychiatry" Medicine—Instant Access to the Minds of Medicine, pp. 1-10, Dec. 14, 2001.

Cho et al "Attention Enhancement System Using Virtual Reality and EEG Biofeedback" Proceedings of the IEEE Reality (2002), IEEE Computer Society, 8 pages.

Danforth et al "A Platform for Gaze-Contingent Virtual Environments" Department of Computer Science, Clemson University, 5 pages, 1999.

Renaud et al "Head-Tracking Fractal Dynamics in Visually Pursuing a Virtual Target" Université du Québec, pp. 333-346, 2001.

Renaud et al "Behavioral Avoidance Dynamics in the Presence of a Virtual Spider" IEEE Transactions on Information Technology in Biomedicine, vol. 6, No. 3, pp. 1-9, Sep. 2002.

Renaud et al "Measuring Sexual Pereferences in Virtual Reality: A Pilot Study" Cyberpschology & Behavior, vol. 5, No. 1, pp. 1-9, 2002.

* cited by examiner

METHOD FOR PROVIDING DATA TO BE USED BY A THERAPIST FOR ANALYZING A PATIENT BEHAVIOR IN A VIRTUAL ENVIRONMENT

CROSS-REFERENCE TO RELATED APPLICATIONS

This is the first application filed for the present invention.

TECHNICAL FIELD

This invention relates to the field of dynamic control. More precisely, this invention relates to the field of tracking a behavior in an environment.

BACKGROUND OF THE INVENTION

Vicarious learning is happening when the patient learns a new behavior from an observation of a model performing the behavior to be learnt in a given situation and especially after having paid attention to the consequences of the model's behavior.

After a vicarious learning, the behavior of the patient should be under control of the same antecedent and subsequent events than those controlling the behavior of the model.

Virtual environments are commonly used today. Available processing power enables a providing of very realistic virtual environments.

Surprisingly, very few virtual environment applications are available for a therapeutic use in mental health. Available applications do not enable a user to configure an application for a patent, i.e. to customize it for a specific pathology to monitor or to cure.

Furthermore, it is usually not possible to collect pertinent data from the user in response to a virtual environment provided, which is a serious limitation if the virtual environment is provided for therapeutic purposes.

In fact, it will be appreciated that usually, it is not possible to know what aspect of the virtual environment is used at every moment by the patient.

In view of the above, there is a need for an apparatus that will provide a virtual environment which will overcome the above-identified drawbacks.

SUMMARY OF THE INVENTION

It is an object of the invention to provide a system which will enable a user to monitor a behavior pattern of a patient.

It is another object of the invention to provide a method and apparatus for enabling a patient to perform operant conditioning.

It is another object of the invention to provide a method and apparatus for enabling a patient to perform vicarious learning.

In accordance with a first aspect of the invention, there is provided a method for providing a visual presentation to a user, comprising providing a visual presentation, defining at least one portion of interest in said visual presentation, selecting one of a plurality of functions outputting a value depending on a geometric relation between a body movement response of said user and said at least one portion of interest in said visual presentation, displaying said visual presentation to said user, outputting said value of said function in response to said providing of said visual presentation to said user.

In accordance with another aspect of the invention, there is provided a method for providing a flexible virtual environment to a user, comprising providing a virtual environment comprising a plurality of objects, defining at least one portion of interest on an object of said plurality of objects, displaying at least said virtual environment to a user and collecting from said user a response to said provided virtual environment, the response comprising an indication of a geometric relation between a body movement response of said user and a portion of interest of said at least one portion of interest.

In accordance with another aspect of the invention, there is provided an apparatus for providing a visual representation to a user, comprising a configuration unit, a zone definition unit for defining at least one zone of interest in a visual presentation, the configuration unit generating a virtual environment configuration signal comprising the defined at least one zone of interest, a virtual presentation outputting unit receiving and displaying the virtual presentation to said user, a data acquisition unit, acquiring and providing at least one response signal from said user in response to the virtual presentation, an analyzing configuration unit receiving from an operator a function generating a value depending on a geometric relation between a body movement response of said user and a zone of interest, an analyzing unit receiving the at least one response signal from said user, the virtual presentation configuration signal and said function and generating a value using a body movement response of said user and a zone of interest of said at least one zone of interest.

In accordance with another aspect of the invention, there is provided an apparatus for providing a flexible virtual environment to a user, comprising a configuration unit, a zone definition unit for defining at least one zone of interest in a virtual environment comprising a plurality of objects, the configuration unit generating a virtual environment configuration signal comprising the defined at least one zone of interest, a virtual environment outputting unit receiving and displaying the virtual environment to said user, a data acquisition unit, acquiring and providing at least one response signal from said user in response to the virtual environment signal and an analyzing unit receiving the at least one response signal from said user and the virtual environment configuration signal and generating an analyzed signal comprising a geometric relation between a body movement response of said user and a defined zone of interest.

In the following, a therapist for a patient will be defined as a user. However, and in its broadest aspect, it will be understood that the user may be a trainer and the patient may be a trainee. In another aspect, the user may be an artist while the patient may be a spectator.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

A virtual environment is introduced using various techniques as explained below. While VRML has been used for an implementation of the invention, it will be appreciated by someone skilled in the art that any other virtual environment modeling language is suitable for implementing the invention.

Generally, a patient reacts in a certain way depending on a particular pathology.

Determining pathology is therefore possible by monitoring a patient reaction to a particular stimulus and tracking its point of regard with respect to predetermined zones of interest.

Figure 1:
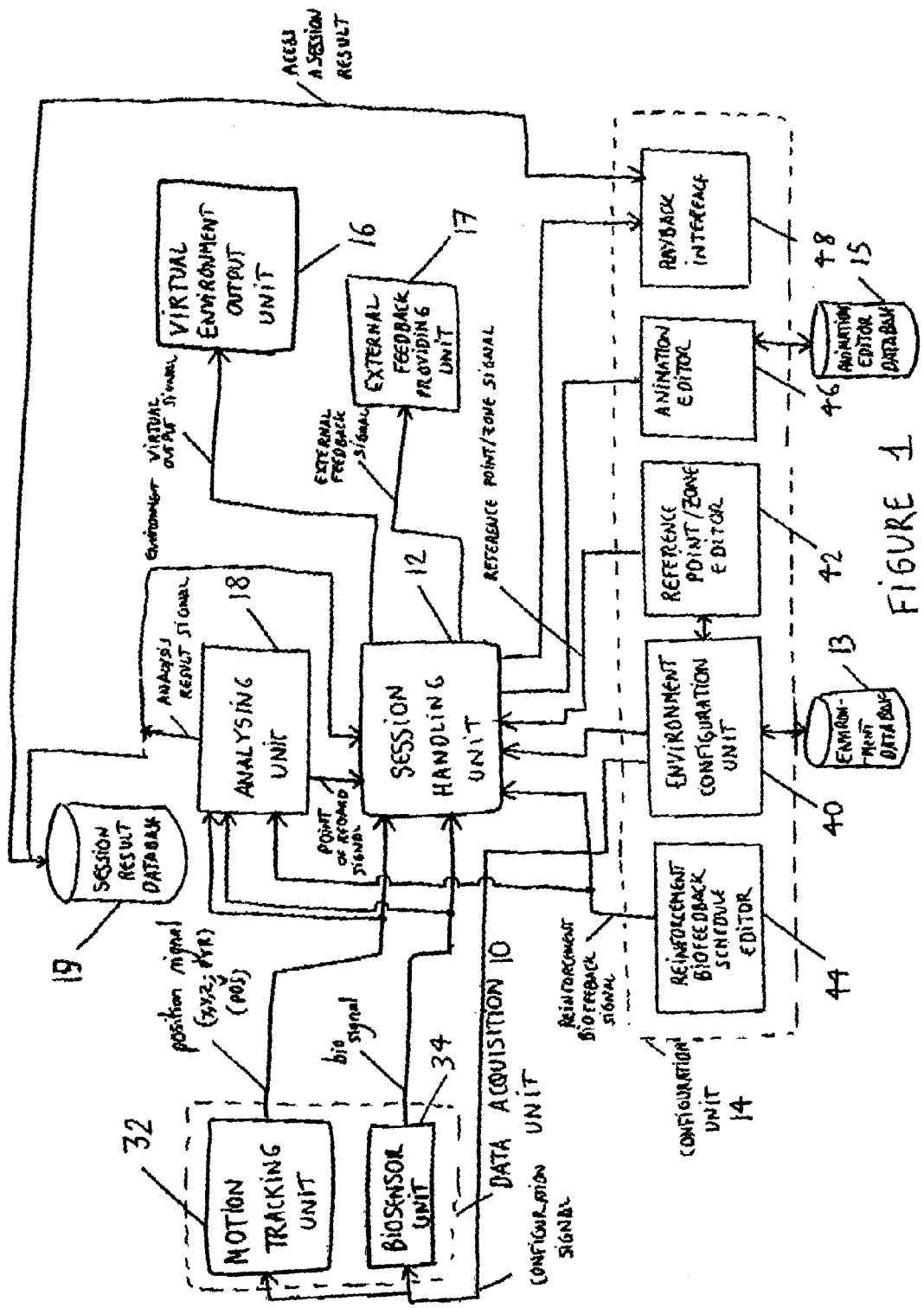
FIG. 1 is a block diagram which shows the preferred embodiment of the invention, the system comprises a data acquisition unit, a session controlling unit, a configuration unit, a environment output unit and an analyzing unit.

Now referring to FIG. 1, there is shown a preferred embodiment of the invention.

The system comprises a data acquisition unit 10, a session handling unit 12, a configuration unit 14, a virtual environment output unit 16 and an analyzing unit 18.

The virtual environment output unit 16 is used to display a virtual environment to a patient. In one embodiment of the invention, the virtual environment output unit 16 is a CAVE system. In another embodiment of the invention, the virtual environment output unit 16 is a Head Mounted Display (HMD). Alternatively, the virtual environment output unit 16 is a desktop display.

The data acquisition unit 10 is used to collect data from the patient in response to the virtual environment provided. In the preferred embodiment of the invention, the data acquisition unit 10 comprises a motion tracking unit 32 and a biosensor unit 34.

The motion tracking unit 32 provides a position signal in Cartesian coordinates (X, Y and Z) of the patient in the virtual environment. Furthermore, a pitch (P) signal, a yaw (Y) signal and a roll (R) signal, indicative of an orientation of the motion tracking unit 32 are provided. It will be appreciated by someone skilled in the art that using the position signal in Cartesian coordinates (X, Y and Z) of the patient together with the pitch (P) signal, the yaw (Y) signal and the roll (R) signal, it is possible to compute the point of regard of the patient in the virtual environment using the analyzing unit 18.

In the case where a CAVE system is used, the motion tracking unit 32 comprises a binocular eye tracking device. In such case, two tracking devices are mounted on goggles and focus on each eye of the patient. Convergence of the two collected projection values is computed using the pitch (P) signal, the yaw (Y) signal and the roll (R) signal of the tracking unit 32. The point of regard of the patient is therefore provided using the intersection of both line of sight of each eye of the patient. In the case of a monocular eye tracking device, a single eye tracking device, such as an infrared camera, is mounted on goggles and focuses on one eye of the patient. The motion tracking unit 32 provides a position signal in Cartesian coordinates (X, Y and Z) of the patient in the virtual environment together with a pitch (P) signal and a yaw (Y) signal, indicative of an orientation of the motion tracking unit 32. The point of regard is computed by the analyzing unit 18.

Alternatively, in the case where a Head Mounted Display (HMD) is used as a virtual environment output unit 16, it is required to have a tracking device in order to be able to output the point of regard. In such case, the motion tracking unit 32 comprises either a binocular eye tracking device or a single eye tracking device to output the point of regard of the patient.

In the case where a desktop computer display is used as a virtual environment output unit 16, the tracking unit comprises a camera which is mounted on the desktop screen and pointed on one eye of the patient. Such camera provides the pitch and the yaw of the gaze of the patient. It is therefore possible to compute the point of regard of the patient.

It will be appreciated by someone skilled in the art that various type of tracking units are suitable for providing the position signal in Cartesian coordinates (X, Y and Z) of the patient. It will further be appreciated that while in the preferred embodiment of the invention, the point of regard is computed using the analyzing unit 18, the point of regard is alternatively directly provided by the motion tracking unit 32.

Furthermore, and depending on a particular setting, the data acquisition unit 10 further comprises at least one biosensor unit 34. The at least one biosensor unit 34 is used in order to collect at least one bio measure (biological signal). The biosensor unit 34 is anyone of an infrared eye-tracking device (eye movements, palpebral movement, pupillary response), a penile plethysmograph, a vaginal plethysmograph, a respiration measurement device, a electrocariography (EKG) providing unit, a electromyography (EMG) providing unit, a electrodermography (EDG) providing unit, a electroencephalography (EEG) providing unit and any recorded physiological signal providing unit.

The configuration unit 14 is used to configure the session handling unit 12. It will be appreciated that the configuration of the session handling unit 12 may be performed prior and or during an ongoing session.

The configuration unit 14 comprises an environment configuration unit 40, a reference point/zone editor 42, a reinforcement/biofeedback schedule editor 44, an animation editor 46 and a playback interface 48.

The environment configuration unit 40 enables users to select and set-up an environment. The environment configuration unit 40 provides an environment signal to the session handling unit 12. An environment database 13 stores environment data.

A user is able to select and set-up either a non-interactive environment or an interactive environment.

The non-interactive environment is used when the patient just watches a predefined animation sequence. The non-interactive environment is used for vicarious learning.

A non-interactive environment located in an environment database 13 may be retrieved by the environment configuration unit 40.

In an alternative embodiment, the non-interactive embodiment is a visual presentation. The visual presentation may be a video sequence, a graphics presentation, etc.

It will be appreciated that in the case of a visual presentation, a point/zone of interest is defined for each image or frame of the visual presentation. Preferably, the reference point/zone editor 42 provides a list of pixels for defining each point/zone of reference. The reference point/zone editor 42 comprises in that embodiment a visual presentation software used to provide the list of pixels. In such case, the visual presentation is loaded by the presentation software and the user selects for each image or frame of the visual editor a point/zone of interest. Alternatively, the point/zone of interest is selected automatically in the visual presentation according to a pattern detection algorithm; such embodiment provides quickly data characterizing the point/zone of interest A pattern may be detected using a neural network.

The interactive environment is preferably used. The interactive environment comprises a world description to which many objects are added. In the preferred embodiment, the environment configuration unit 40 selects a world description from the environment database 13. Using the environment configuration unit 40, the user adds a plurality of various objects to the world description. Alternatively, a saved interactive world is retrieved from the environment database 13 in accordance with a user selection. Preferably, each object of the plurality of various objects is defined using Virtual Reality Mark Language (VRML). As known by someone skilled in the art, the object is defined using world coordinates.

The environment configuration signal further provides a configuration signal to the data acquisition unit 10. It will be appreciated by someone skilled in the art that depending on the application and environment selected, a particular configuration has to be implemented by the data acquisition unit 40. The configuration signal comprises a number of sensors to use and a number indicative of degree of freedom for each sensor in use.

The reference point/zone editor 42 enables the user to create at least one reference point/zone. The reference point/zone are placed in an environment and are zone of interest. Preferably, the created at least one reference point/zone is placed on an existing object in the environment. It will be appreciated that stored objects in the environment database 13 may comprise at least one reference point/zone. In such case, it will be appreciated that if an object to which a reference point/zone is moving, the reference point/zone is moving also.

The at least one reference point/zone is created by selecting an object defined in the environment configuration unit 40 and identifying a desired location for the reference point/zone on the object selected.

Alternatively, the user creates a reference zone in the environment. In such case, an existing environment created using the environment configuration unit 40 is used and the reference zone is placed by the user at a desired location. Preferably, the reference zone is any one of a sphere, a cylinder and a rectangle. Alternatively, any type of geometric forms may be used. It will be appreciated that additional properties may be set for a defined reference zone such as transparency, definition of the zone over time, etc.

As explained, below, it will further be appreciated that the definition of the at least one reference point/zone is of great advantage in order to perform an analysis of the behavior of a patient.

Preferably, the reference point/zone editor 42 is capable of storing the created reference point/zone.

It will be appreciated by someone skilled in the art that the at least one reference point/zone may or may not be visible to the patient in the environment.

The reinforcement/biofeedback schedule editor 44 enables a user to provide a positive or a negative contingency, reinforcement or a punition. The reinforcement/biofeedback schedule editor 44 further enables mapping triggers to feedback.

A positive contingency means that a feedback is given to the patient, while a negative contingency means that a feedback is withdrawn from the patient. The contingency is the sequential relationship established between a behavior, as defined by received signals from the data acquisition unit, and a feedback.

A reinforcement increases a behavior occurrence probability with which it is in contingency with. The reinforcement is said to be appetitive to the patient while punishment is said to be aversive to the patient. A trigger is an action following one or multiple conditions that are met. The trigger launches a feedback It will be appreciated that the trigger operates when any one of or a combination of any one of the following conditions is met.

A first condition is met when the point of regard of the patient provided by the motion tracking unit 32 is above or below a certain angular distance from a point of reference defined. The user therefore provides a plurality of points of reference to the reinforcement biofeedback schedule editor 44. To each point of reference provided of the plurality of points of reference, an angular distance setting and an above/below setting is attached.

A second condition is met when the point of regard of the patient provided by the motion tracking unit 32 is inside or outside a zone of reference. Such a zone of reference is defined by the user through the reinforcement biofeedback schedule editor 44.

A contingent feedback is produced when the motion tracking unit 32 crosses the zone of reference.

It will be appreciated that a triggering event may be either instantaneous or may depend upon a time spent in the zone of reference. The user may therefore provide a list comprising a plurality of zones of reference. To each of the zones of reference, a value indicating if inside or outside and a value indicating a time value for providing the trigger signal are provided.

A third condition is met when the position signal provided by the motion tracking unit and which comprises in one embodiment X, Y, Z and Pitch (P), Yaw (Y) and Roll (R) is above or below a certain angular distance from the point of reference.

A fourth condition is met when the position signal provided by the motion tracking unit 32 and which comprises, in one embodiment, the Cartesian coordinates (X, Y and Z) together with the Pitch (P) signal, the Yaw (Y) signal and the Roll (R) signal is inside or outside a zone of reference A fifth condition is met when a bio signal provided by the biosensor unit 34 is above or below a predetermined threshold value.

Such condition is useful in order to control a level of attention and alertness of the patient through his palpebral and pupillary responses. Sexual arousal may be detected using a penile or vaginal plethysmograph.

The user may therefore provide a list of biosensor unit together with a list of predetermined thresholds, each attached to a biosensor.

Alternatively, a pattern to detect may be attached to a selected biosensor unit or to a position signal provided by the motion tracking unit 32.

In order to enable the use of such pattern detection, a pattern to detect for any one of a bio signal, a position signal and a point of regard signal is provided to the reinforcement biofeedback schedule editor 44.

It will be appreciated that it is possible to set a number of repetitions required in an occurrence to trigger a feedback. It will be appreciated that the triggering may be immediately performed after meeting the required conditions or after a predetermined number of repetitions of these conditions. The triggering may also happen following a variable schedule in which the number of condition repetitions to meet fluctuates around a predetermined average value, which is defined as variable ratio schedule. Alternatively, the triggering may also happen following a fixed probability of the meeting of the conditions.

The user therefore provides to the reinforcement biofeedback schedule editor 44 a signal which indicates if a repetition is required. The user further provides to the reinforcement biofeedback schedule editor 44 a signal which indicates if a probability is attached to a triggering event.

Triggering may be performed immediately after meeting a predetermined amount of conditions. The triggering may happen following a variable amount of time, whose time value fluctuates around a predetermined average. In that case, the user provides to the reinforcement/biofeedback schedule editor 44 a signal indicative of a time to wait and an average signal.

The triggering may be conditional on the time elapsed between a first behavioral response and a second behavioral response, the triggering may be done if the second behavioral response is detected before or after a certain amount of time has elapsed. In that case, the user provides a signal indicative of a behavior selected, a signal indicative a time delay setting and a signal indicating "before or after the time delay" to the reinforcement biofeedback schedule editor 44.

It will be appreciated that the feedback may be delivered in a discrete form or a continuous and proportional form. In the case of a continuous and proportional feedback, selected parameters will be modulated by specific parameters of the behavior.

In fact, it will be appreciated that any function depending on any one of the position signal provided by the motion tracking unit and the bio signal provided by the biosensor unit may be used for providing the trigger signal.

The external feedback providing unit 17 is preferably an haptic device, such as an exoskeleton motion base device. Simultaneously, a visual feedback as well as a sound feedback may be further provided by the external feedback providing unit 17.

The external feedback providing unit 17 provides to the patient a tactile feedback such as a vibration, a pressure, heat, etc.

Alternatively, the external feedback providing unit 17 provides to the patient an olfactory feedback.

It will be appreciated that alternatively, the feedback is provided to the patient directly in the virtual environment or in the virtual presentation. For instance, a video may be provided to the patient as a feedback in the environment or in the presentation.

Alternatively, a model animation, through avatar animator or any particular animation may also be provided as a feedback to the environment.

A modification of the environment may also be performed as a feedback. The modification of the environment comprises a modification of any one of the color of the environment, the light in the environment, the transparency of an object in the environment, the visibility, etc.

Alternatively, a sound signal is provided as a feedback.

Alternatively, a text may also be provided as a feedback.

It will be appreciated that a combination of the above-identified type of feedbacks may be provided simultaneously.

It will be appreciated by someone skilled in the art that various schedule of feedback triggering may be implemented. The user is preferably able to visualize all active schedules as well as all inactive schedules.

The user is further able to provide a vicarious learning environment to the patient.

The animation editor 46 is used to generate or modify an animated feedback or a vicarious learning scenario. The animation editor 46 comprises a VRML object selector and viewer, a VRML object sequencer and an animation parameter setting module.

The VRML object selector and viewer enables the user to view and selects objects from an object database or from the environment database 13.

The VRML object sequencer enables the user to set a sequence of VRML objects. Using the VRML object sequencer, the user creates an animation.

An animation parameter setting module, in the animation editor 46, enables the user to set a plurality of parameters for a given VRML object sequence. The plurality of parameters for a given VRML sequence comprises an alpha behavior parameter which characterizes the speed of apparition of VRML objects one after another. The plurality of parameters further comprises a parameter indicating duration of the animation. The plurality of parameters further comprises a parameter indicative of a stop and go function, which indicates when an animation should stop, wait and restart.

An animation editor database 15 stores the plurality of parameters of the animation editor.

The playback interface 48 enables the user to review and analyze one or more multiple sessions as well as to compare a model session to the patient session. In the preferred embodiment, the playback interface 48 comprises two synchronized views showing first and third person point of view at the same time. The playback interface 48 further comprises features such as play, forward, rewind, pause and a precise navigation timeline slider. The playback interface 48 further provides specific data such as statistic data display, acceptable trajectory deviancy display and other as explained below.

More precisely, the playback interface 48 enables a user to load an active session.

The first person playback shows the exact same view of the patient during the session. In the case of a multi-session playback, the user can switch session while playing back. The users can also toggle following additional information, The point of regard overlay is a crosshair showing where the regard of the patient is pointing.

Point/zone of reference is also highlighted with variation of transparency in one embodiment of the invention.

The third person point of view relates to a "ghost view" or "god view". It enables the user to visualize from any angle the playback of one or more session and to navigate and zoom with a mouse and a keyboard through the virtual environment.

In an XYZ user trajectory display, a line shows the patient trajectory. In the case of a multiple session, each line has a distinctive attribute such as color, type of line, etc.

The user is able to toggle the point of regard. Furthermore, the third person playback provides arrows oriented in the direction of the point of regard.

The playback interface 48 further enables the user to have a display of any reinforcement/biofeedback schedule that has been used for a session, if applicable, on the navigation timeline slider. A colored line is then displayed on the slider showing exactly when the reinforcement/biofeedback schedule is applied. If a plurality of reinforcement/biofeedback schedules is applied, distinctive attributes for each line are applied.

If any compatible biological sensing device has been used for a session, the playback interface 48 displays the biological signal synchronized with the first and the third person views.

The playback interface 48 further displays a summary and details of cumulate statistics for the current environment configuration. In the case of multiple sessions, such functionality is accessible only if the sessions are using the same environment configuration.

The playback interface 48 is used to interface with the reference point/zone editor 12. It will be appreciated that the user is able to edit reference point/zone of a loaded session and generate new data by playing it back, as a simulation.

In the case of a non-interactive environment, as used in vicarious learning, the user sets a start time and a stop time for reference point/zone on the navigation timeline slider. Start and stop time are displayed using different colored bracket. Preferably and in order to differentiate reference point/zone, an open bracket is used for a start, while a close bracket is used for a stop.

The analyzing unit 18 performs a real time analysis of the position signal and the bio signal. More precisely, the analysis performed by comparing a position signal with reinforcement/biofeedback conditions defined. The analyzing unit 18 provides an analysis result signal which may be stored in a session result database 19, A filtering of variations of the position signal and the bio signal may be performed through a pattern analysis functions.

Conditions to trigger a feedback may be discrete numerical results obtained through mathematical analysis of time series. Biofeedback variations can be mediated in a continuous fashion by variations in the results obtained through mathematical analysis of time series. Mathematical analysis of time series can be of different type and may be performed in univariate or multivariate fashion, i.e. it can result from analysis done on one signal time series or on the covariation of multiple signals times series Mathematical analysis of time series can be used to identity patterns in the data.

Preferably, a time series length setting is provided by the user. Such setting is used to set a number of data points on which the time series analysis is performed.

Alternatively, a time domain analysis is performed. Such time domain analysis may be linear. For instance, mean, variance, standard deviation, correlation, parameters coming from an ARIMA (Auto Regressive Integrated Moving Average), model as well as any similar statistic function, may be used. In another embodiment, a non linear time domain analysis may be performed, which is performed using detrended fluctuations analysis (a fractal index), a correlation dimension analysis, a Lyapunov exponent computing, a neural network pattern recognition, etc.

Figure 2:
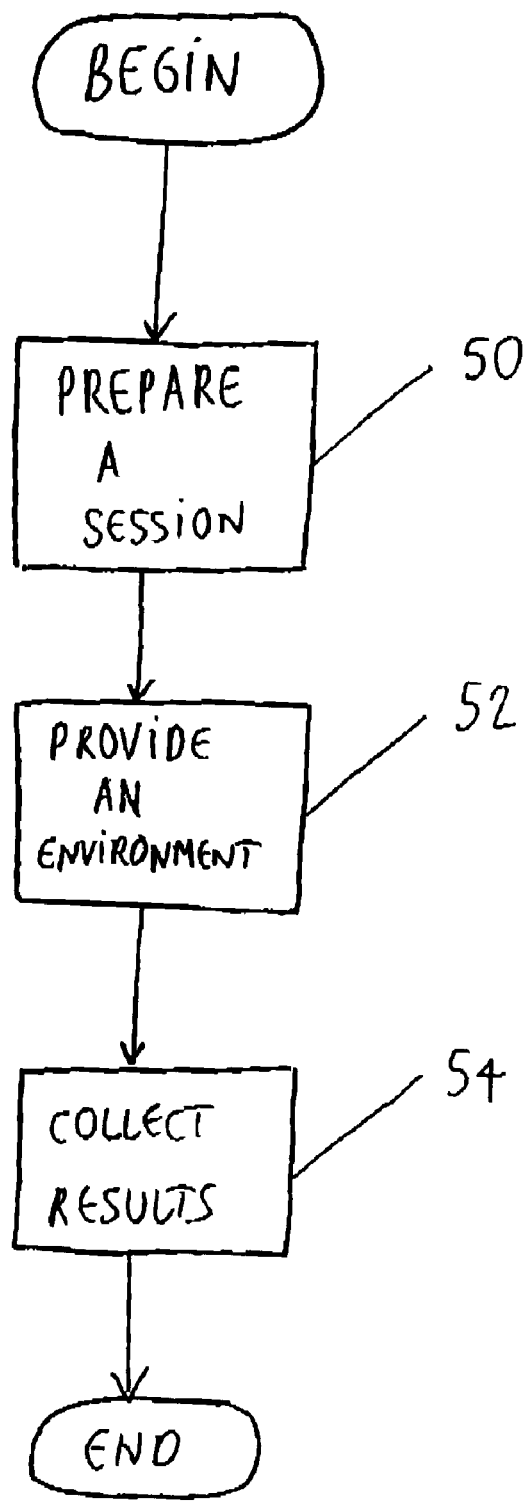
FIG. 2 is a flowchart which shows one embodiment of the invention; according to a first step, a session is prepared by a user for a patient; then an environment is provided to the user and results are collected.

Now referring to FIG. 2 and according to step 50, a session is prepared for a patient by the user. The session is prepared using the configuration unit 14.

More precisely, the environment configuration unit 40 is used to define a virtual environment comprising a plurality of objects. The reference point/zone editor 42 is used to create/edit a plurality of points/zones on particular objects of interest of the plurality of objects. The animation editor 46 is then used to create an animation in the created world with the objects.

Reinforcement/biofeedback may then be incorporated in the session by the user depending on the patient using the reinforcement/biofeedback schedule editor 44.

In another alternative embodiment, an existing session is retrieved from the environment database 13.

According to step 52, the prepared session is then provided to the patient. As explained above, the environment is either an interactive environment or a non-interactive environment. The session is provided by the session handling unit 12 to the virtual environment output unit 16.

According to step 54, results are collected from the patient after the providing of the session to the patient. As explained above, the results are collected using the motion tracking unit 32 and the biosensor unit 34 if applicable. A real time analysis of the results collected is then performed by the analyzing unit 18. The analyzed results are provided to the session result database 19.

The session result database 19 may be accessed in the future by the playback interface 48 in order to perform a post-experience analysis of the behavior of the patient by the user.

Figure 3:
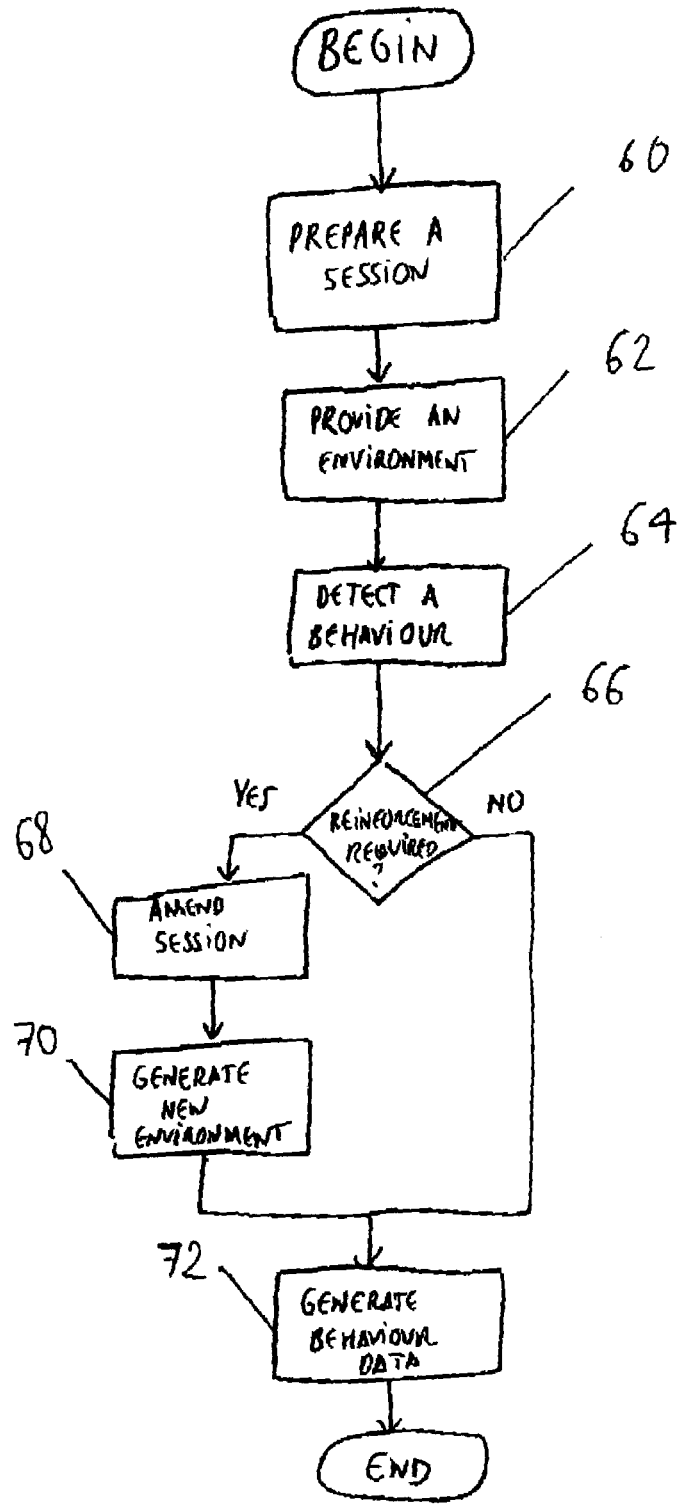
FIG. 3 is a flowchart which shows another embodiment of the invention where a feedback is provided to the patient in response to a behavior.

Now referring to FIG. 3, there is shown how interactivity is achieved in the preferred embodiment of the invention.

According to step 60, a session is prepared. The session is prepared in accordance as explained above in step 50 of FIG. 2.

According to step 62, the environment is provided to the client, the environment is provided as explained in accordance with step 52 of FIG. 2.

According to step 64, a behavior is detected. The position signal and the bio signal are provided to the analyzing unit 18 which provides an analysis signal to the session handling unit 12. A behavior is then detected using at least the analysis signal.

In accordance with step 66, a check is performed in order to find out if a feedback must be provided to the patient. The check is performed using the reinforcement/biofeedback signal provided by the reinforcement/biofeedback schedule editor 44 to the session handling unit 12. If a feedback must be provided, the session provided to the patient is amended in accordance with the feedback required as explained above and in accordance with step 68.

In accordance to step 76, a new environment, compliant with the amended session, is provided to the patient.

Still referring to FIG. 3 and in accordance with step 72, behavior data for the patient are computed and provided to the session result database 19, and may be accessed in the future by the playback interface 48 in order to perform a post-experience analysis of the behavior of the patient by the user.

Alternatively, an input/output communication interface is used to provide an access to a remote processing unit or to a remote storing unit. Preferably, a Wide Area Network (WAN), such as the Internet, is used to share data between the system and at least one of the remote processing unit and the remote storing unit.

Such access to a remote storing unit enables a sharing of data between the system and the remote storing unit. For instance; remote environment data comprised in the remote storing unit may be downloaded in the environment database 13. Alternatively, the animation editor database 15 may be amended using data comprised in the remote storing unit. The analysis result signal stored in the session result database 19 may also be provided to the remote storing unit. It will be appreciated that such input/output communication interface enables more flexibility.

While it will be appreciated that this invention is, preferably used by a therapist assisting a patient, it will be appreciated by someone skilled in the art that the therapist may be a trainer assisting a trainee in order to learn a proper reaction. Alternatively, the therapist may be an artist providing an interactive form of art to an interactive spectator.

While it will be appreciated that in the preferred embodiment of the invention the motion tracking unit 32 provides a motion tracking signal used to define the point of regard of the patient, it will be appreciated that motion tracking unit 32 may provide a motion tracking signal in response to any body movement.

The embodiments of the invention described above are intended to be exemplary only. The scope of the invention is therefore intended to be limited solely by the scope of the appended claims.

I claim:

1. A method for providing data to be used by a therapist for analyzing a patient behaviour in a virtual environment comprising a plurality of objects, said method comprising:

defining at least one zone of interest on at least one of said plurality of objects in said virtual environment, said at least one zone of interest being selected by said therapist and the selection being invisible to said patient;

displaying said virtual environment to said patient;

collecting data from said patient when said patient is viewing said virtual environment, said data comprising an indication of a geometric relation between a body movement response of said patient and said defined at least one zone of interest; and providing said data collected from said patient to said therapist for analyzing said patient behaviour.

2. The method as claimed in claim 1, wherein the body response movement comprises a point of regard of said user.

3. The method as claimed in claim 1, further comprising amending the virtual environment.

4. The method as claimed in claim 1, further comprising providing a feedback to the patient depending on the collected data.

5. The method as claimed in claim 4, wherein the feedback comprises at least one of an haptic feedback, a visual feedback, a sound feedback and an olfactory feedback.

6. The method as claimed in claim 1, wherein said virtual environment is provided by any one of a video source, a multimedia presentation and an animation sequence.

* * * * *